(12) United States Patent
Singh et al.

(10) Patent No.: US 11,144,351 B2
(45) Date of Patent: Oct. 12, 2021

(54) COMPUTING SYSTEM WITH RESOURCE MANAGEMENT MECHANISM AND METHOD OF OPERATION THEREOF

(71) Applicant: Samsung Electronics Co., Ltd., Suwon-si (KR)

(72) Inventors: Vikram Singh, Karnataka (IN); Wentao Wu, Milpitas, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 88 days.

(21) Appl. No.: 16/365,149

(22) Filed: Mar. 26, 2019

(65) Prior Publication Data
US 2019/0220313 A1    Jul. 18, 2019

Related U.S. Application Data

(63) Continuation of application No. 14/849,202, filed on Sep. 9, 2015, now Pat. No. 10,296,383.

(60) Provisional application No. 62/190,897, filed on Jul. 10, 2015.

(51) Int. Cl.
*G06F 9/50* (2006.01)
*G06F 9/46* (2006.01)

(52) U.S. Cl.
CPC .......... *G06F 9/50* (2013.01); *G06F 9/46* (2013.01); *G06F 9/5094* (2013.01)

(58) Field of Classification Search
CPC ......... G06F 3/0688; G06F 9/46; G06F 9/5094
See application file for complete search history.

(56) References Cited

U.S. PATENT DOCUMENTS

| | | |
|---|---|---|
| 6,484,235 B1 | 11/2002 | Horst et al. |
| 7,478,178 B2 | 1/2009 | Torudbakken et al. |
| 7,675,929 B1 | 3/2010 | Davis |
| 7,698,251 B2 | 4/2010 | Brelsford et al. |
| 7,869,356 B2 | 1/2011 | Dodson et al. |
| 8,139,575 B2 | 3/2012 | Biran et al. |
| 8,205,205 B2 | 6/2012 | Franke |
| 8,521,941 B2 | 8/2013 | Regula |
| 8,589,936 B2 | 11/2013 | Murray et al. |
| 9,459,908 B2 | 10/2016 | Anand et al. |
| 10,114,675 B2 | 10/2018 | Ding et al. |
| 2005/0223150 A1 | 10/2005 | Ohmoto et al. |
| 2006/0253619 A1 | 11/2006 | Torudbakken et al. |
| 2009/0006932 A1 | 1/2009 | Biran et al. |
| 2009/0154456 A1 | 6/2009 | Dodson et al. |
| 2012/0166690 A1 | 6/2012 | Regula |

(Continued)

FOREIGN PATENT DOCUMENTS

| | | |
|---|---|---|
| CN | 1677956 A | 10/2005 |
| CN | 101063947 A | 10/2007 |

(Continued)

*Primary Examiner* — Sisley N Kim
(74) *Attorney, Agent, or Firm* — Perspectives Law Group, Corp.

(57) ABSTRACT

A computing system includes: a command fetch block configured to determine a host profile for representing a requesting host corresponding to a processing request; and a credit checker block, coupled to the command fetch block, configured to calculate an instance budget at a communication endpoint from an overall resource of the communication endpoint for controlling the processing request at the communication endpoint.

20 Claims, 5 Drawing Sheets

(56) References Cited

U.S. PATENT DOCUMENTS

| | | | |
|---|---|---|---|
| 2014/0108776 A1 | 4/2014 | Miyauchi et al. | |
| 2014/0289412 A1* | 9/2014 | Doddavula | H04L 41/5003 |
| | | | 709/226 |
| 2016/0029047 A1* | 1/2016 | Spidella | H04L 65/4084 |
| | | | 725/93 |
| 2016/0170790 A1 | 6/2016 | Anand et al. | |
| 2016/0292007 A1 | 10/2016 | Ding et al. | |
| 2017/0199767 A1 | 7/2017 | Yu et al. | |

FOREIGN PATENT DOCUMENTS

| | | | |
|---|---|---|---|
| CN | 101266557 A | 9/2008 | |
| CN | 101308468 A | 11/2008 | |
| CN | 102835068 A | 12/2012 | |
| CN | 103092699 A | 5/2013 | |
| JP | 2006235960 A | 9/2006 | |
| WO | 2012020544 A1 | 2/2012 | |

* cited by examiner

COMPUTING SYSTEM WITH RESOURCE MANAGEMENT MECHANISM AND METHOD OF OPERATION THEREOF

CROSS-REFERENCE TO RELATED APPLICATION(S)

This application is a Continuation of co-pending U.S. patent application Ser. No. 14/849,202 filed Sep. 9, 2015, and the subject matter thereof is incorporated herein by reference thereto. U.S. patent application Ser. No. 14/849,202 filed Sep. 9, 2015 further claims the benefit of U.S. Provisional Patent Application Ser. No. 62/190,897 filed Jul. 10, 2015, and the subject matter thereof is incorporated herein by reference thereto.

TECHNICAL FIELD

An embodiment of the present invention relates generally to a computing system, and more particularly to a system for resource management mechanism.

BACKGROUND

Modern consumer and industrial electronics, such as computing systems, servers, appliances, televisions, cellular phones, automobiles, satellites, and combination devices, are providing increasing levels of functionality to support modern life. While the performance requirements can differ between consumer products and enterprise or commercial products, there is a common need for more performance while reducing power consumption. Research and development in the existing technologies can take a myriad of different directions.

One such direction includes improvements in managing available resources. As the number of electronic devices and processing power of each device grows, the demand on computing resources is growing exponentially. Efficiently or effectively managing the available resources can provide the increased levels of performance and functionality across multiple devices.

Thus, a need still remains for a computing system with resource management mechanism for improved processing performance while reducing power consumption through increased efficiency. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a system, including: a command fetch block configured to determine a host profile for representing a requesting host corresponding to a processing request; and a credit checker block, coupled to the command fetch block, configured to calculate an instance budget at a communication endpoint from an overall resource of the communication endpoint for controlling the processing request at the communication endpoint.

An embodiment of the present invention provides a method including: determining a host profile for representing a requesting host corresponding to a processing request; and calculating an instance budget at a communication endpoint from an overall resource of the communication endpoint for controlling the processing request at the communication endpoint.

An embodiment of the present invention provides a system, including: determining a host profile for representing a requesting host corresponding to a processing request; and calculating an instance budget at a communication endpoint from an overall resource of the communication endpoint for controlling the processing request at the communication endpoint.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
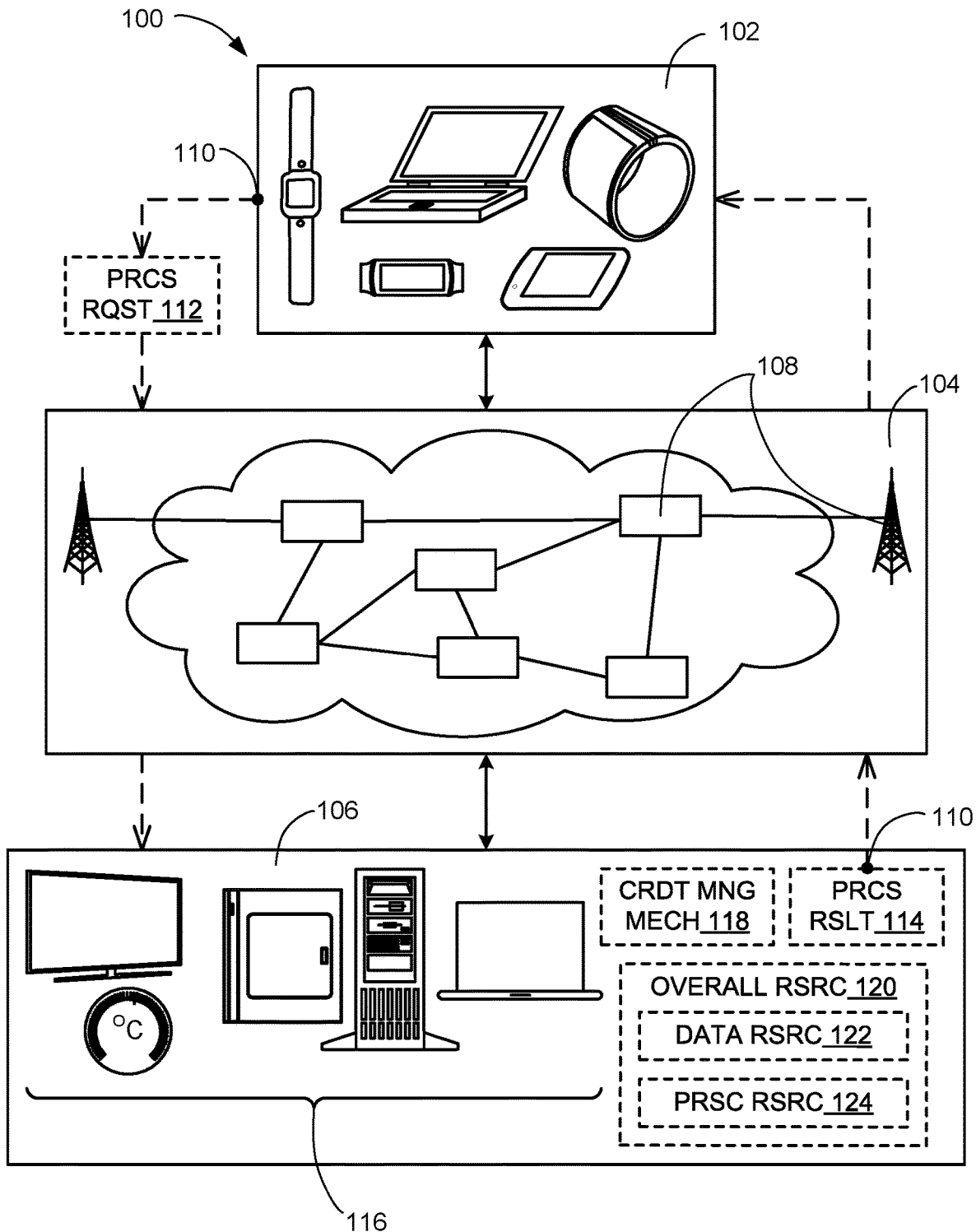
FIG. 1 is an exemplary block diagram of a computing system with resource management mechanism in an embodiment of the present invention.

The following embodiments include a data provider implementing a credit management mechanism to calculate an instance budget at the data provider. The data provider can use the instance budget to process a processing request from a requesting host. The data provider can use up to a portion of overall resource as designated by the instance budget. The data provider including a smart storage device or an Internet of Things (IoT) device can control the resource expenditure using the instance budget at the data provider, consuming the processing request to generate a processing result.

The target resource can include a node thermal capacity for performing or implementing the target task, such as the node having the most thermal headroom or the node best suited for balancing power consumption and performance. The thermal candidate set can be dynamically calculated based on thermal capacitance between nodes, present power, present thermal load, thermal model, or a combination thereof.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the invention.

However, it will be apparent that the invention and various embodiments may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

The term "block" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a block is written in the apparatus claims section below, the blocks are deemed to include hardware circuitry for the purposes and the scope of apparatus claims.

The blocks in the following description of the embodiments can be coupled to one other as described or as shown. The coupling can be direct or indirect without or with, respectively, intervening between coupled items. The coupling can be physical contact or by communication between items.

Referring now to FIG. 1, therein is shown an exemplary block diagram of a computing system 100 with resource management mechanism in an embodiment of the present invention. The computing system 100 can include a first device 102, such as a client device, connected to a second device 106, such as a client device or server. The first device 102 can communicate with the second device 106 through a network 104, such as a wireless or wired network For example, the device 102 can include a smart phone, a wearable device or a health monitor, a sensor or a processing device for Internet of Things (IoT), or a combination thereof. Also for example, the device 102 can include a computer, grid computing resources, a virtualized computer resource, cloud computing resource, routers, switches, peer-to-peer distributed computing devices, or a combination thereof. Also for example, the device 102 can include a server utilized by a service provider. Also for example, the device 102 can include a storage device, such as a smart storage device, a distributed computing resource or a distributed storage system, a datacenter, a disc drive, an array, or a combination thereof.

The first device 102 can be a standalone device or can be incorporated with a mobile device, an entertainment device, an article of clothing, an accessory, an adhesive or a securing mechanism, a multi-functional device, a server or datacenter, or a combination thereof. The first device 102 can couple to the network 104 to communicate with the second device 106.

The second device 106 can be a mobile device or a non-mobile device. For example, the second device 106 can be any of a variety of mobile devices, such as a smartphone, a tablet device, a cellular phone, a personal digital assistant, a notebook computer, a netbook computer, a thin client device, a multi-functional mobile communication or entertainment device, an internet of things (IoT) device or a combination thereof.

The second device 106 can also be a non-mobile device such as a computing device, an appliance, or a combination thereof. The second device 106 can be any of a variety of centralized or decentralized computing devices. For example, the second device 106 can be a desktop computer, a grid computing resource, a server, a server farm, a virtualized computing resource, a cloud computing resource, a router, a switch, a peer-to-peer distributed computing resource, or a combination thereof.

The second device 106 can be centralized in a single computer room, distributed across different rooms, distributed across different geographical locations, or embedded within a telecommunications network. For example, the second device 106 can be a particularized machine, such as a mainframe, a server, a cluster server, a rack mounted server, or a blade server, or as more specific examples, an IBM System z10™ Business Class mainframe or a HP ProLiant ML™ server.

The second device 106 can also be an appliance including a living room appliance, a kitchen appliance, a bathroom appliance, a bedroom appliance, or a combination thereof. For example, the second device 106 can include a television, a video device, an audio device, a clock, a lighting unit, a home entertainment system, a washing machine, a refrigerator, an oven, a microwave, a gaming console, or a combination thereof. In addition, the second device 106 can include a thermostat, an alarm system, a heating unit, a cooling unit, an electronic door lock, a garage door opener, a power generation system, or a combination thereof.

The network 104 can be a variety of networks or communication mediums. For example, the network 104 can include wireless communication, wired communication, optical communication, ultrasonic communication, or a combination thereof. Satellite communication, cellular communication, Bluetooth™, Bluetooth™ Low Energy (BLE), wireless High-Definition Multimedia Interface (HDMI), ZigBee™, Near Field Communication (NFC), Infrared Data Association standard (IrDA), wireless fidelity (WiFi), and worldwide interoperability for microwave access (WiMAX) are examples of wireless communication that can be included in the network 104. Ethernet, HDMI, digital subscriber line (DSL), fiber to the home (FTTH), and plain old telephone service (POTS) are examples of wired communication that can be included in the network 104.

Further, the network 104 can traverse a number of network topologies and distances. For example, the network 104 can include a direct connection, personal area network (PAN), local area network (LAN), metropolitan area network (MAN), wide area network (WAN) or any combination thereof.

The network 104 can include one or more intermediate network component 108. The intermediate network component 108 can be between communication endpoints 110 generating and consuming a processing request 112. The intermediate network component 108 can include a device or a portion therein configured to relay information between the communication endpoints 110. For example, the intermediate network component 108 can include a router, a repeater, a base station, an amplifier, an interface within a device, or a combination thereof.

The communication endpoints 110 can include a device or a portion therein generating information. The communication endpoints 110 can include the device or the portion therein generating a request, generating a processing output, accessing information stored therein, or a combination thereof.

For example, one of the communication endpoints 110 can generate or produce the processing request 112 for accessing information. The processing request 112 can be communicated to another instance of the communication endpoints 110, and the other instance can generate or produce a processing result 114 as information or output corresponding to the processing request 112.

Also for example, the communication endpoints 110 can include a data provider 116 generating or producing the processing result 114. The data provider 116 is an instance of the communication endpoints 110 configured to process the processing request 112 and avail the requested information. The data provider 116 can calculate or generate the processing result 114, access the processing result 114 stored within the data provider 116, or a combination thereof. The data provider 116 can communicate the processing result 114 back to the instance of the communication endpoints 110 communicating the processing request 112.

The data provider 116 can be a consumer for the processing request 112. The data provider 116 can process and respond to the processing request 112 without utilizing a separate device or a separate portion outside of the data provider 116. For example, the data provider 116 can be a storage device or storage portion within a device including the information requested by the processing request 112. Also for example, the data provider 116 can be the computing device or a calculation unit generating and directly providing the information requested by the processing result 114.

The intermediate network component 108 can be between the communication endpoints 110. The intermediate network component 108 can relay the processing request 112, the processing result 114, or a combination thereof between the communication endpoints 110.

The computing system 100 can use the data provider 116 to implement a credit management mechanism 118 for the computing system 100. The credit management mechanism 118 is a method, a process, a circuitry, or a combination thereof configured to manage and balance expenditure of overall resources 120 for the data provider 116 in processing the processing request 112.

The credit management mechanism 118 can include a function, a digital circuit set, a step or an instruction, an equation, or a combination thereof predetermined by the computing system 100 to manage and balance the expenditure of the overall resources 120. The credit management mechanism 118 can further be configured to dynamically reconfigure itself, such as in adaptive or self-learning instances of the function, the circuitry, the step or instruction, the equation, or a combination thereof. The credit management mechanism 118 can manage and balance the expenditure of the overall resources 120 based on assigning credits or budgets for processing one or more instances of the processing request 112.

The overall resources 120 can represent a total processing capability of the data provider 116. For example, the overall resources 120 can represent an amount of data, a processing rate, or a combination thereof. As a more specific example, the overall resources 120 can include a data resource 122, a processing resource 124, or a combination thereof.

The data resource 122 can be a storage capacity. The data resource 122 can include volatile or non-volatile storage. The data resource 122 can include storage for latter access, the amount of data capable of simultaneous access at a given time or period, or a combination thereof.

The processing resource 124 can be a capacity associated with manipulating data. The processing resource 124 can include a rate or a speed of processing. The processing resource 124 can further represent a number of instructions or an amount of data that can be simultaneously processed for a given period.

The computing system 100 can use the credit management mechanism 118 to control, manage, divide, dedicate, expend, or a combination thereof for the overall resources 120 for processing one or more instances of the processing request 112. For example, the computing system 100 can prioritize pending instances of the processing request 112 including input/output (TO) read/write request using the credit management mechanism 118.

Continuing with the example, the computing system 100 can prioritize processing based on port, physical function, virtual function, or a combination thereof. The computing system 100 can use the credit management mechanism 118 for common data center environments where multiple computing hosts share the data provider 116 while observing Service Level Agreement (SLA) response time commitments. Details regarding the credit management mechanism 118 are discussed below.

For illustrative purposes, the computing system 100 is shown with the second device 106 and the first device 102 as the communication endpoints 110, although it is understood that the computing system 100 can have a different partition between the first device 102, the second device 106, and the network 104.

For example, the first device 102, the second device 106, or a combination thereof can also function as part of the network 104. Also for example, the second device 106 is shown as the data provider 116, but it is understood that the first device 102 can be the data provider 116.

As a more illustrative example, the computing system 100 can include the first device 102, the second device 106, or a combination thereof for managing and providing computing resources, such as for storage systems or communication systems. The computing system 100 can include the first device 102, the second device 106, or a combination thereof for managing and providing computing resources including access to memory, processing cycles or time, thermal capacity, bandwidth, or a combination thereof.

Continuing with the illustrative example, the computing system 100 can include the data provider 116, implemented with the first device 102, the second device 106, or a combination thereof. The computing system 100 can use the data provider 116 to manage and provide computing resources for one or more hosts. The computing system 100 can include the data provider 116, the one or more hosts, or a combination thereof implemented as components within one device or system, or implemented as multiple separate devices or systems.

As a more specific example, the computing system 100 can include the data provider 116 implemented as a multifunction storage device, a network storage device, a server, a base station, or a combination thereof servicing hosts implemented as other servers, workstations or end-user devices. Also as a more specific example, the computing system 100 can further include the data provider 116 implemented as a disc drive, a processor, a control circuitry, a software function or firmware function, or a combination thereof servicing other circuitry or devices within a single independent computing device or a distributed computing system.

Figure 2:
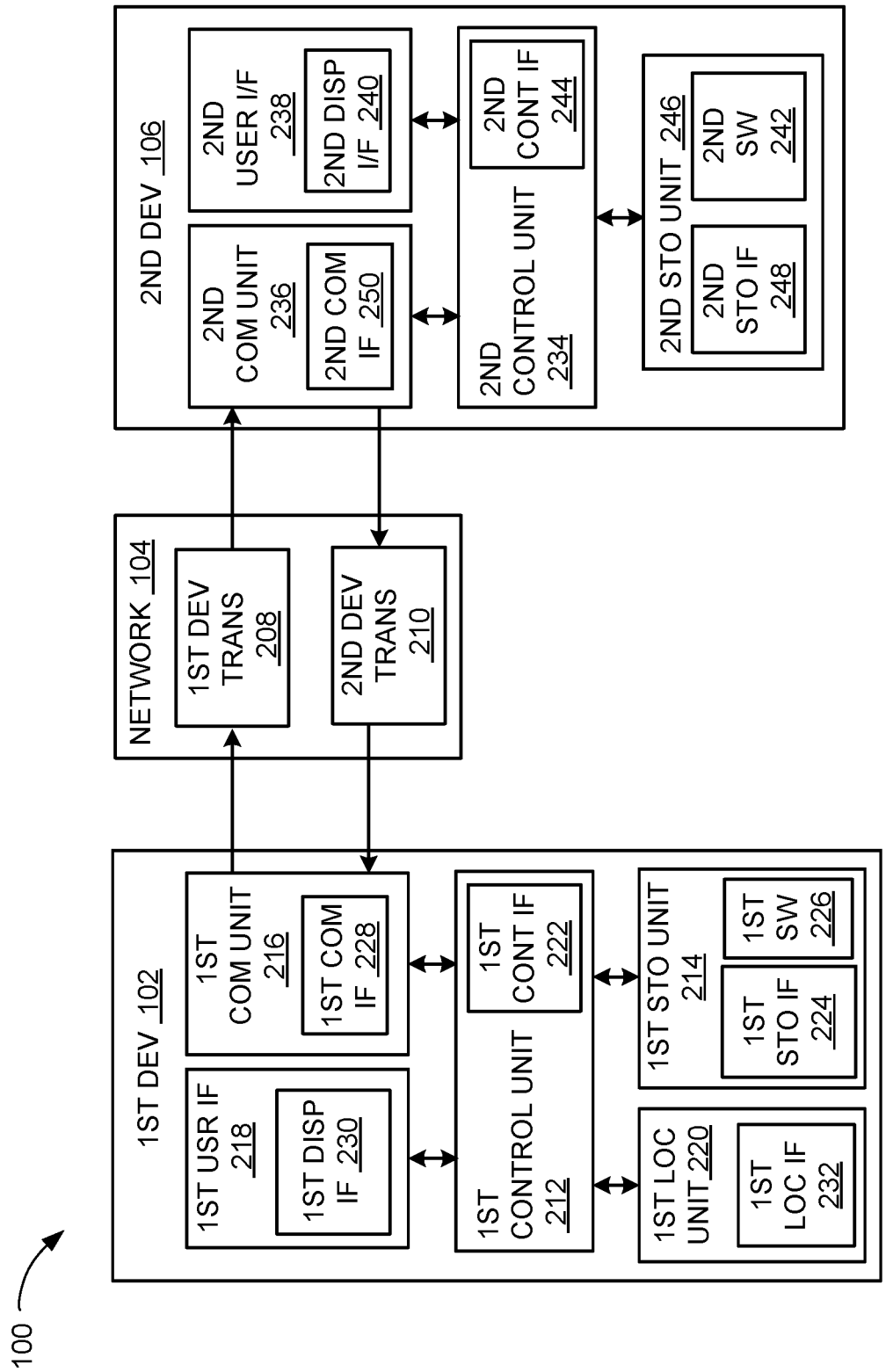
FIG. 2 is an exemplary block diagram of the computing system.

Referring now to FIG. 2 therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a relay device.

Also for illustrative purposes, the computing system 100 is shown with the second device 106 as a mobile device, a computing device, an appliance, or a combination thereof, although it is understood that the computing system 100 can have the second device 106 as a different type of device.

For brevity of description in this embodiment of the present invention, the first device 102 will be described as a client device and the second device 106 will be described as a mobile device, a computing device, an appliance, a wearable device, or a combination thereof. Embodiments of the present invention are not limited to this selection for the type of devices. The selection is an example of the embodiments of the present invention.

The first device 102 can include a first control unit 212, a first storage unit 214, a first communication unit 216, a first user interface 218, a location unit 220, or a combination thereof. The first control unit 212 can include a first control interface 222. The first control unit 212 can execute a first software 226 to provide the intelligence of the computing system 100. The first control unit 212 can be implemented in a number of different manners.

For example, the first control unit 212 can be a processor, an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The location unit 220 can generate a location information, a heading, an acceleration, and a speed of the first device 102, as examples. The location unit 220 can be implemented in many ways. For example, the location unit 220 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The location unit 220 can include a location interface 232. The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first control interface 222.

The first storage unit 214 can store the first software 226. The first storage unit 214 can also store relevant information, such as advertisements, biometric information, points of interest (POIs), navigation routing entries, reviews/ratings, feedback, or any combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a notebook computer, and the network 104.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a sensor, a signal generator, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100, including receiving location information from the location unit 220. The first control unit 212 can further execute the first software 226 for interaction with the network 104 via the first communication unit 216.

The second device 106 can be optimized for implementing the various embodiments in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows the user to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, biometric information, points of interest, navigation routing entries, reviews/ratings, feedback, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the location unit 220 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or an antenna, for interaction with the network 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 3 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

For illustrative purposes, the computing system 100 is described by operation of the first device 102 and the second device 106. It is understood that the first device 102 and the second device 106 can operate any of the blocks and functions of the computing system 100. For example, the first device 102 is described to operate the location unit 220, although it is understood that the second device 106 can also operate the location unit 220.

Figure 3:
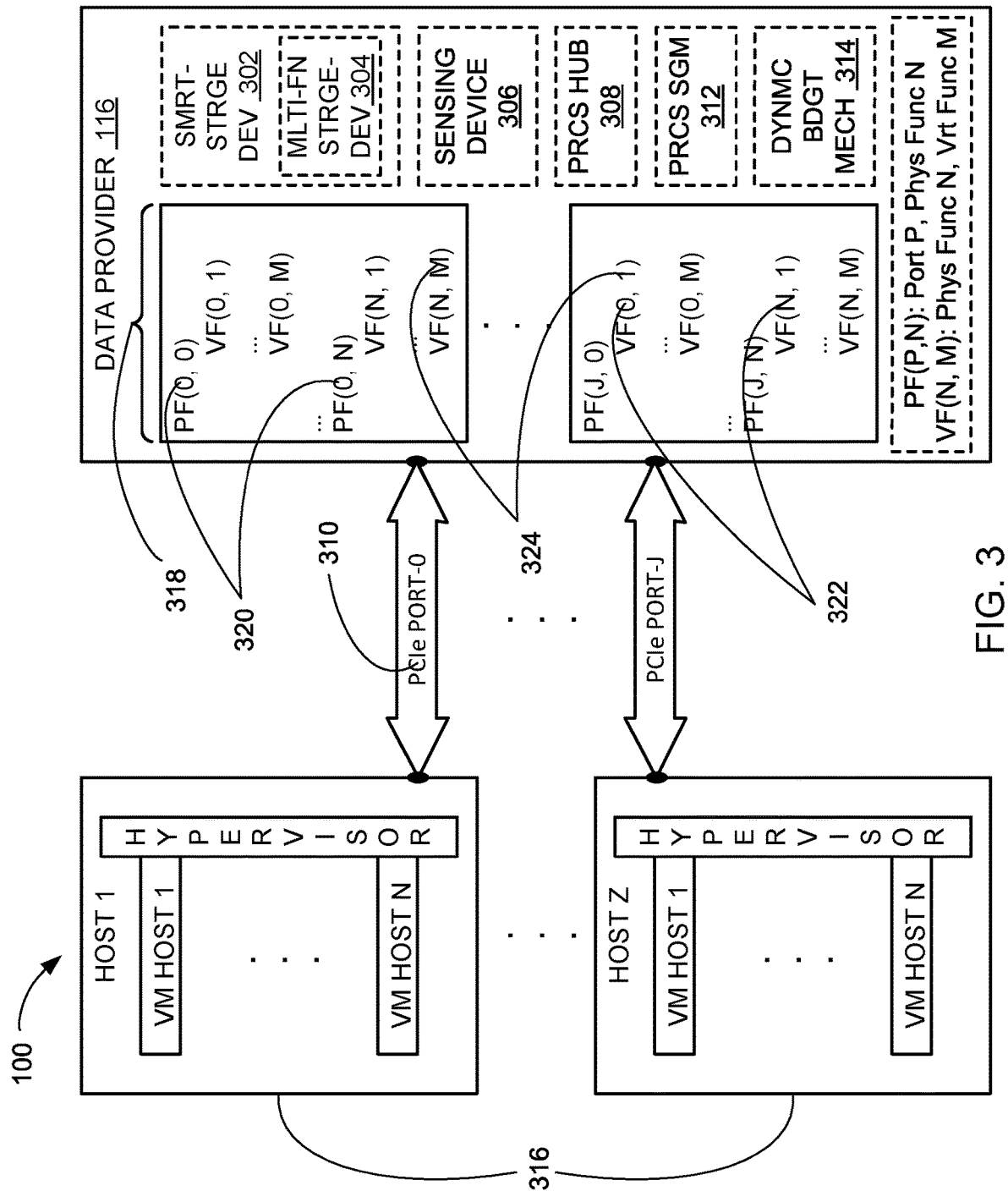
FIG. 3 is a further exemplary block diagram of the computing system.

Referring now to FIG. 3, therein is shown a further exemplary block diagram of the computing system 100. The further exemplary block diagram can show the communication endpoints 110 of FIG. 1. The communication endpoints 110 can include the data provider 116, such as a smart-storage device 302, a multi-function storage-device 304, a sensing device 306, a processing hub 308, other capabilities (not shown) or a combination thereof.

The smart-storage device 302 is a device configured to store, retain, and provide access to data with capabilities in addition to the basic storage-access capability. The smart-storage device 302 can provide processing in addition to storing and accessing the data. The smart-storage device 302 can include circuitry, functions, or a combination thereof for processing the stored or accessed data to provide a result, for processing operation of the storage or the access for the data, or a combination thereof.

The smart-storage device 302 can include the multi-function storage-device 304. The multi-function storage-device 304 is a device for storing and availing data for accommodating multiple computing hosts, multiple hosted virtual machines within a host, or a combination thereof.

The multi-function storage-device 304 can connect to and simultaneously service multiple instances of the processing request 112 from the multiple computing hosts and their hosted virtual machines, such as in enterprise data centers utilizing shared memory. The multi-function storage-device 304 can include enterprise Solid State Drive (SSD) storage devices.

The data provider 116 can further include other types of storage devices. For example, the data provider 116 can include a volatile storage device, a non-volatile storage device, or a combination thereof. As a more specific example, the data provider 116 can include disc drives, RAM including dynamic or static RAM, flash memory devices, NAND memory devices, other non-volatile memory devices, distributed memory or distributed computing systems, disc arrays, control circuits or control devices thereof, or a combination thereof.

The sensing device 306 is a device or a portion therein configured to provide information regarding an environment or a target associated with the sensing device 306. For example, the sensing device 306 can include a biometric device, a position or movement monitoring device, an environmental monitoring device, or a combination thereof. As a more specific example, the sensing device 306 can include a heart monitor, a movement tracker, a GPS device, an accelerometer, a pressure sensor, a thermometer, a light sensor, an acoustic sensor or a microphone, or a combination thereof.

The processing hub 308 is a device or a portion therein configured to provide a processed output regarding the environment or a target associated with the sensing device 306. For example, the computing system 100 including IoT technology can use the sensing device 306 to detect various information. The sensing device 306 can provide the sensed information directly to a processing device, such as a server or a smart phone. Also for example, the computing system 100 including IoT technology can combine the sensed information with stored information.

Also for example, the sensing device 306 can further provide the sensed information to the processing hub 308, which can summarize the sensed information or provide intermediate processing. The processing hub 308 can provide the summary or the intermediate output to the communication endpoints 110, such as the server or the smart phone for further processing. The processing hub 308 can summarize or provide intermediate processing by compressing sensor data, calculating and providing a pattern for the sensor data, categorize or group and provide the grouping or the category, statistically analyzing the sensor data, or a combination thereof.

The processing hub 308 and the sensing device 306 can be the communication endpoints 110. The processing hub 308 or the sensing device 306 can each produce the processing request 112 of FIG. 1, function as the data provider 116 implementing the credit management mechanism 118 of FIG. 1, or a combination thereof.

For example, the processing hub 308 can be the data provider 116 to the sensing device 306 in providing uploading resources, to the servicing device, such as the server or and end-user device, in providing the sensed information or an intermediate result thereof. Also for example, the sensing device 306 can function as or take the role of the data provider 116 to the processing hub 308 or the servicing device in providing the sensed information. The processing hub 308, the sensing device 306, or a combination thereof can implement the credit management mechanism 118 to control or manage the overall resources 120 in providing or accessing the sensed information or the intermediate result thereof.

The data provider 116 can utilize a communication mechanism 310. The communication mechanism 310 can include a method, a process, a connection, or a combination thereof for exchanging information between devices or between portions of a device. The communication mechanism 310 can include a wire, a bus, a frequency, a time slot, a code, a protocol, or a combination thereof.

For example, the communication mechanism 310 can include a carrier frequency, a communication protocol, or a combination thereof for communicating between the processing hub 308, the sensing device 306, the second device 106 of FIG. 1, or a combination thereof. Also for example, the communication mechanism 310 can include a bus, a protocol, or a combination thereof for internal bus, external bus, parallel or serial bus, or a combination thereof. As a more specific example, the communication mechanism 310 can include Peripheral Component Interconnect (PCI) standard, PCI Express (PCIe) standard, Universal Serial Bus (USB), or other expansion buses or protocols.

The data provider 116 can utilize a processing segment 312 for processing the processing request 112. The processing segment 312 is a unit of resources utilized in for processing information for the data provider 116. The processing segment 312 can include a processing period or a duration of time, a division or a grouping of memory, a processing cycle, or a combination thereof for processing the information for the data provider 116.

For example, the processing segment 312 can include a clock or a time duration for performing an instruction or an operation for the data provider 116. Also for example, the processing segment 312 can include an arbitrary duration of time predetermined by the computing system 100 or a session established or recognized by the computing system 100.

The data provider 116 can use a dynamic budgeting mechanism 314 to control the overall resources 120 for processing the processing request 112. The dynamic budgeting mechanism 314 is a process, a method, a circuit, an equation, or a combination thereof for dividing, assigning, apportioning, managing, or a combination thereof for the overall resources 120.

The dynamic budgeting mechanism 314 can be a process, a method, a circuit, an algorithm, or a combination thereof within the credit management mechanism 118. The dynamic budgeting mechanism 314 can dedicate a portion of the overall resources 120 for processing the processing request 112.

The dynamic budgeting mechanism 314 can be based on the processing segment 312. The dynamic budgeting mechanism 314 can assign and dedicate a portion of the overall resources 120 for one or more instance of the processing segment 312. The dynamic budgeting mechanism 314 can dynamically assign and dedicate a portion of the overall resources 120. The dynamic budgeting mechanism 314 can dynamically assign and dedicate the overall resources 120 or a portion therein during an operation of the data provider 116, such as based on receiving, soliciting, expecting, or a combination thereof for the processing request 112.

The data provider 116 can communicate with a requesting host 316. The requesting host 316 is an instance of the communication endpoints 110 producing and transmitting the processing request 112. The requesting host 316 can include a device or a portion therein different and separate from the data provider 116.

The computing system 100 can include a host profile 318 for representing the requesting host 316. The host profile 318 is a description of one or more instances of the requesting host 316 serviced by the data provider 116. The host profile 318 can describe one or more instances of the requesting host 316 connected or assigned to the data provider 116.

The host profile 318 can describe the connection between the requesting host 316 and the data provider 116, a function or a service available to the requesting host 316 provided by the data provider 116, or a combination thereof. For example, the host profile 318 can include a connection identifier 320, a physical function identifier 322, a virtual function identifier 324, or a combination thereof.

The connection identifier 320 is a description of the connection between the requesting host 316 and the data provider 116. The connection identifier 320 can describe the physical mechanism for exchanging information between devices or between portions of a device. The connection identifier 320 can describe a port, a channel, a connection detail or specifics, or a combination thereof at the requesting host 316, the data provider 116, or a combination thereof.

The physical function identifier 322 is a description of full-feature or total capability of a function or a feature provided by the data provider 116 and available for access to the requesting host 316 through the processing request 112. The virtual function identifier 324 is a description of a partial-feature, a portion within the full feature or the total capability, or a combination thereof for a corresponding function or feature provided by the data provider 116 and available for access to the requesting host 316 through the processing request 112.

The virtual function identifier 324 can lack configuration resources included in the physical function. The physical function identifier 322, the virtual function identifier 324, or a combination thereof can correspond to the communication mechanism 310 including, for example PCIe. The physical function identifier 322, the virtual function identifier 324, or a combination thereof can further represent access or implementations for functions, processes, features, or a combination thereof available at the data provider 116.

As an illustrative example, the computing system 100 can include a data center, such as for telecommunications and storage systems. The data center can use shared resources, such as for memory or data storage for accommodating multiple hosts, with the data provider 116 supporting multiple instances of the requesting host 316. The communication mechanism 310 between the instances of the requesting host 316 and the data provider 116 can include PCIe. The data provider 116 can include the smart-storage device 302, the multi-function storage-device 304, or a combination thereof.

Also as an illustrative example, the computing system 100 can include the data provider 116 and the requesting host 316 in a single device. The data provider 116 can include the first storage unit 214 of FIG. 2 servicing the requesting host 316 including the first control unit 212 of FIG. 2, the first communication unit 216 of FIG. 2, the first user interface 218 of FIG. 2, or a combination thereof. The data provider 116 can also include the second storage unit 246 of FIG. 2 servicing the requesting host 316 including the second control unit 234 of FIG. 2, the second communication unit 236 of FIG. 2, the second user interface 238 of FIG. 2, or a combination thereof.

As a further detailed example, the computing system 100 can include the data provider 116 implemented as an overall system of a redundant array of independent disks (RAID) drive or a storage array. Also as a further detailed example, the computing system 100 can include the data provider 116 implemented as a single individual drive or disc within the RAID drive or within the storage array.

The data provider 116 can implement the credit management mechanism 118 to control and manage the usage or dedication of the overall resources 120 across multiple instances of the requesting host 316. The data provider 116 can implement the credit management mechanism 118 to divide and assign appropriate portions of the overall resources 120 to support each instance of the requesting host 316.

The data provider 116 can use the dynamic budgeting mechanism 314 to dynamically divide and assign portions of the overall resources 120 according to the current or projected processing needs or requirements for each instance of the requesting host 316. The data provider 116 can further use the credit management mechanism 118 to manage conflicting demands from the requesting host 316.

The individual instances of the requesting host 316 from amongst all instances of the requesting host 316 connected to and supported by the data provider 116 can have significantly differing performance requirements that must be fulfilled to guarantee satisfying important SLA metrics. The data provider 116 can be expected to provide Quality of Service (QoS) measurements or performance parameters to each instance of the requesting host 316 according to the corresponding SLA.

For example, one or more instance of the requesting host 316 can require a high request fulfillment rate involving insignificant data transfer amounts or high bandwidth. Also for example, one or more instance of the requesting host 316 can present few requests that each require significant data transfer bandwidth. Also for example, one or more instance of the requesting host 316 can exhibit steady presentation request rates, each request requiring approximately uniform device-fulfillment response times. Also for example, one or more instance of the requesting host 316 can exhibit unpredictable bursts for request presentation rates.

The data provider 116 can utilize the credit management mechanism 118 to dynamically manage the various different needs and requirements across instances of the requesting host 316. The data provider 116 can enable the instances of the requesting host 316 to meet their specific mandated performance requirements despite other host request interference, or, in a worst case, allow hosts to fail their SLAs in a relatively graceful and balanced manner.

The data provider 116 can utilize the communication mechanism 310 which can be, for example, PCIe, including multi-function storage-device 304, and can expose a plurality of PCIe physical ports through a PCIe host interface. The PCIe device can increase the number of mechanisms providing logical host connections, increasing the number of hosts that can simultaneously connect to the device.

Figure 4:
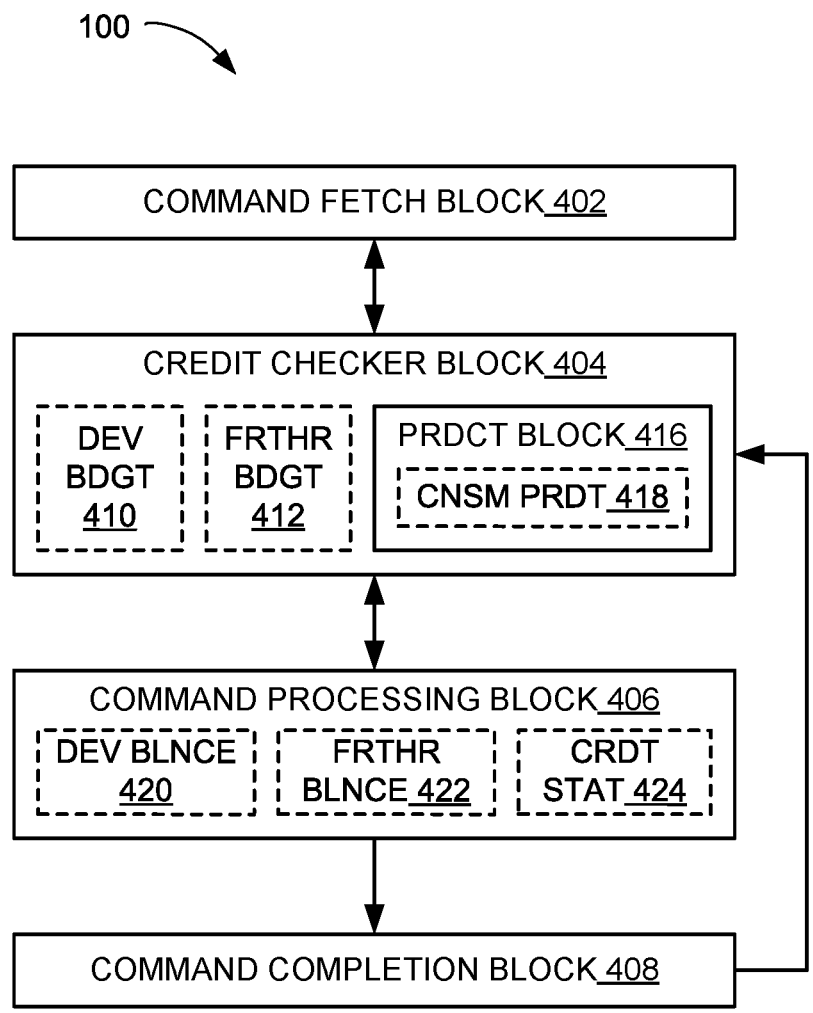
FIG. 4 is a control flow of the computing system.

Referring now to FIG. 4, therein is shown a control flow of the computing system 100. The computing system 100 can include a command fetch block 402, a credit checker block 404, a command processing block 406, a command completion block 408, or a combination thereof.

The blocks, buffers, units, or a combination thereof can be coupled to each other in a variety of ways. For example, blocks can be coupled by having the input of one block connected to the output of another, such as by using wired or wireless connections, instructional steps, process sequence, or a combination thereof. Also for example, the blocks, buffers, units, or a combination thereof can be coupled either directly with no intervening structure other than connection means between the directly coupled blocks, buffers, units, or a combination thereof, or indirectly with blocks, buffers, units, or a combination thereof other than the connection means between the indirectly coupled blocks, buffers, units, or a combination thereof.

As a more specific example, one or more inputs or outputs of the credit checker block 404 can be directly connected to one or more inputs or outputs of the command fetch block 402, the command completion block 408, or a combination thereof using conductors or operational connections therebetween for direct coupling, or connected through other units, blocks, buffers, devices, or a combination thereof for indirect coupling. Also for example, the command fetch block 402, the command completion block 408, or a combination thereof can be similarly coupled to the command processing block 406. Also for example, the command fetch block 402, the command completion block 408, or a combination thereof can be coupled directly or indirectly to one or more instances of the requesting host 316 of FIG. 3.

The command fetch block 402 is configured to interface with one or more instances of the requesting host 316 of FIG. 3. The command fetch block 402 can communicate with the requesting host 316 for the data provider 116 of FIG. 1.

The command fetch block 402 can communicate with the requesting host 316 in a variety of ways. For example, the command fetch block 402 can solicit the requesting host 316 for the processing request 112 of FIG. 1 or fetch the processing request 112 from the requesting host 316. Also for example, the command fetch block 402 can receive the processing request 112 from the requesting host 316 at the data provider 116 for processing the processing request 112.

The command fetch block 402 can use the first communication unit 216 of FIG. 2, the second communication unit 236 of FIG. 2, or a combination thereof to communicate the processing request 112. The command fetch block 402 can further use the first storage interface 224 of FIG. 2, the second storage interface 248 of FIG. 2, the first control interface 222 of FIG. 2, the second control interface 244 of FIG. 2, or a combination thereof to communicate the processing request 112. The command fetch block 402 can further use the communication mechanism 310 of FIG. 3, such as the PCIe bus or Advanced Extensible Interface (AXI) bus.

The command fetch block 402 can include a profile block 403. The profile block 403 can further determine the host profile 318 of FIG. 3 for representing one or more instances of the requesting host 316. The profile block 403 can determine the host profile 318 including the connection identifier 320 of FIG. 3, the physical function identifier 322 of FIG. 3, the virtual function identifier 324 of FIG. 3, or a combination thereof.

The profile block 403 can determine the host profile 318 in a variety of ways. For example, the profile block 403 can determine the host profile 318 based on communicating identification or configuration information with one or more instances of the requesting host 316. As a more specific example, the profile block 403 can communicate with the host profile 318 for receiving device identification from the requesting host 316. The profile block 403 can further identify the connection identifier 320 utilized for communication with the corresponding instance of the requesting host 316.

Also for example, the profile block 403 can determine the host profile 318 based on predetermined information associated with each instance of the requesting host 316 connected to the data provider 116. The profile block 403 can include a list of functions, configuration information, performance parameters or settings, or a combination thereof predetermined by the computing system 100, system administrator, or a combination thereof.

Continuing with the example, the profile block 403 can include the list of functions, the configuration information, the performance parameters or settings, or a combination thereof based on an SLA or QoS. The profile block 403 can determine the host profile 318 based on grouping the functions, configuration information, parameters or settings, or a combination thereof according to each instance of the requesting host 316.

As a more specific example, the profile block 403 can determine the connection identifier 320 based on the configuration information. Also as a more specific example, the profile block 403 can determine the physical function identifier 322, the virtual function identifier 324, or a combination thereof from the list of functions, the performance parameters or settings, or a combination thereof.

Also for example, the profile block 403 can determine the host profile 318 based on selecting or identifying the instance of the host profile 318 or a portion within the host profile 318 corresponding to the incoming instance of the processing request 112. The profile block 403 can identify the host profile 318 based on identifying the requesting host 316 transmitting or generating a current or received instance of the processing request 112. The profile block 403 can use the identification information or the connection identifier 320 associated with the requesting host 316 to select the corresponding instance of the host profile 318.

The command fetch block 402 can use the first storage unit 214, the second storage unit 246, a dedicated circuit or a component therein, or a combination thereof to determine the host profile 318. The command fetch block 402 can further use the first control unit 212, the second control unit 234, or a combination thereof to determine the host profile 318. The command fetch block 402 can store the host profile 318 in the first storage unit 214, the second storage unit 246, or a combination thereof.

As a more specific example, the command fetch block 402 can use a volatile memory, a nonvolatile memory, an internal memory, an external memory, or a combination thereof, such as non-volatile random access memory (NVRAM), Flash memory, disk storage, or a volatile storage such as static random access memory (SRAM) or dynamic random access memory (DRAM), NAND memory devices, distributed memory or distributed computing systems, disc arrays, control circuits or control devices thereof, or a combination thereof. Also as a more specific example, the command fetch block 402 can use a processor, an embedded processor, a microprocessor, a hardware control logic, a hardware finite state machine (FSM), a digital signal processor (DSP), a passive circuitry component, an active circuitry component, a control circuitry included in memory units or communication units, or a combination thereof.

The command fetch block 402 can access one or more of the storage units for known or previously determined profiles. The command fetch block 402 can use one or more of the storage units or the control units to match to the profiles, generate new profiles, store new profiles, or a combination thereof. The command fetch block 402 can further store the new profiles in the one or more storage units.

The command fetch block 402 can further get designation or division information from the credit checker block 404. The command fetch block 402 can prompt, receive, or a combination thereof for designation or division of the overall resources 120 of FIG. 1 or a portion therein corresponding to one or more instances of the requesting host 316.

The control flow can pass from the command fetch block 402 to the credit checker block 404. The control flow can pass through a variety of ways. For example, control flow can pass by having processing results of one block passed to another block, such as by passing the processing result, such as the host profile 318, the processing request 112, an initial or intermediate instances thereof, or a combination thereof, from the command fetch block 402 to the credit checker block 404.

Also for example, the control flow can pass by storing the processing results at a location known and accessible to the credit checker block 404, such as by storing the host profile 318 or the processing request 112 at a storage location known and accessible to the credit checker block 404. Also for example, the control flow can pass by notifying the credit checker block 404, such as by using a flag, an interrupt, a status signal, or a combination thereof.

The credit checker block 404 is configured to manage the overall resources 120 for processing the processing request 112. The credit checker block 404 can manage the overall resources 120 by dividing or assigning the overall resources 120 or a portion therein. The credit checker block 404 can manage the overall resources 120 based on calculating an instance budget 410, a further budget 412, or a combination thereof.

The instance budget 410 is a portion of the overall resources 120 designated for servicing a corresponding instance of the requesting host 316, a corresponding instance of the processing request 112, or a combination thereof. The instance budget 410 can be an allotment of the data resource 122 of FIG. 1, the processing resource 124 of FIG. 1, or a combination thereof set aside or intended for servicing the corresponding instance of the requesting host 316, the corresponding instance of the processing request 112, or a combination thereof.

The further budget 412 is a further portion of the overall resources 120 designated for servicing different instances of the processing request 112, different instances of the requesting host 316, or a combination thereof. The further budget 412 can be separate and different from the instance budget 410. The further budget 412 can be specific for a further instance of the requesting host 316, a further instance of the processing request 112, or a combination thereof different from the present processing request 112, the present requesting host 316, or a combination thereof corresponding to the instance budget 410.

The credit checker block 404 can calculate one or more budgets corresponding to all instances of the requesting host 316 connected to or serviced by the data provider 116. The credit checker block 404 can further calculate one or more budgets corresponding to active or communicating instances of the requesting host 316 connected to or serviced by the data provider 116.

The credit checker block 404 can calculate the instance budget 410, the further budget 412, or a combination thereof from or based on the overall resources 120. The credit checker block 404 can calculate the instance budget 410, the further budget 412, or a combination thereof each as a distinct and non-overlapping portion within the overall resources 120 of the data provider 116.

The credit checker block 404 can calculate the instance budget 410, the further budget 412, or a combination thereof using the credit management mechanism 118 of FIG. 1, the dynamic budgeting mechanism 314 of FIG. 3, or a combination thereof. For example, the credit checker block 404 can calculate the instance budget 410, the further budget 412, or a combination thereof based on the host profile 318 for corresponding instance of the requesting host 316 according to the credit management mechanism 118, the dynamic budgeting mechanism 314, or a combination thereof.

As a more specific example, the credit checker block 404 can calculate the instance budget 410, the further budget 412, or a combination thereof based on the connection identifier 320, the physical function identifier 322, the virtual function identifier 324, or a combination thereof. Also as a more specific example, the credit checker block 404 can calculate the instance budget 410, the further budget 412, or a combination thereof based on the processing request 112, identity of the requesting host 316, or a combination thereof.

Also as a more specific example, the combination of PCIe Physical Ports, Physical Functions, and Virtual functions can dramatically increase the number of physical hosts and virtual machines that connect to, and share the processing resources of, Multi-function PCIe storage devices. The multi-function PCIe device can meter an attaching host's or virtual machine's service level to manage interference between the hosts.

Continuing with the example, the credit checker block 404 can calculate the instance budget 410, the further budget 412, or a combination thereof for implementing credit-based management that identifies when a host or virtual machine is consuming too many device resources or is acting as a "noisy neighbor" to other attaching hosts. The credit checker block 404 can calculate the instance budget 410, the further budget 412, or a combination thereof for limiting the data resource 122, such as data transfer bandwidth, the processing resource 124, such as command count, or a combination thereof.

The credit checker block 404 can use the process, the method, the equation, the circuitry, or a combination thereof predetermined for the credit management mechanism 118, the dynamic budgeting mechanism 314, or a combination thereof for calculating the instance budget 410, the further budget 412, or a combination thereof. The command fetch block 402 can use the processing request 112, the identity of the requesting host 316 associated with the processing request 112, the host profile 318, or a combination thereof as input parameter for the credit management mechanism 118, the dynamic budgeting mechanism 314, or a combination thereof.

For example, the credit checker block 404 can include a ratio, a priority, a weight, or a combination thereof corresponding to a type or a category corresponding to each of the requesting host 316. Also for example, the credit checker block 404 can include a ratio, a priority, a weight, or a combination thereof corresponding to a type or a specific available or known instance of the processing request 112. Also for example, the credit checker block 404 can include a ratio, a priority, a weight, or a combination thereof corresponding to the SLA for each of the requesting host 316.

The credit checker block 404 can calculate the instance budget 410, the further budget 412, or a combination thereof based on dividing the overall resources 120 according to the ratio, the priority, the weight, or a combination thereof. As a more specific example, the credit checker block 404 can calculate a total for the ratio components, the priorities, the weights, or a combination thereof at a given or a current instance of the processing segment 312.

The credit checker block 404 can divide the overall resources 120 by the total to calculate a single unit within the overall resources 120 for the processing segment 312. The credit checker block 404 can calculate the instance budget 410, the further budget 412, or a combination thereof based on multiplying the single unit of the overall resources 120 by a ratio, a priority, a weight, or a combination thereof associated with corresponding instance of the requesting host 316, specific processing request 112, the SLA, or a combination thereof.

The credit checker block 404 can calculate the instance budget 410, the further budget 412, or a combination thereof at one of the communication endpoints 110 of FIG. 1. The credit checker block 404 can further control at one of the communication endpoints 110 the processing request 112 or amount of resources dedicated or expended for the processing request 112.

The credit checker block 404 can calculate the budget at the data provider 116. The credit checker block 404 can further control the consumption or usage of the resource at the data provider 116 for executing or implementing the processing request 112. The credit checker block 404 can calculate, control, or a combination thereof at the data provider 116 including the smart-storage device 302 of FIG. 3, the multi-function storage-device 304 of FIG. 3, the sensing device 306 of FIG. 3, the processing hub 308 of FIG. 3, or a combination thereof.

The credit checker block 404 can calculate the instance budget 410, the further budget 412, or a combination thereof for prioritizing pending instances of the processing request 112 including input/output (IO) read/write request. The credit checker block 404 can prioritize pending instances of the processing request 112 according to the requesting host 316 and the budget calculated for the requesting host 316.

The credit checker block 404 can calculate the instance budget 410, the further budget 412, or a combination thereof for the processing segment 312 of FIG. 3. The credit checker block 404 can calculate the instance budget 410, the further budget 412, or a combination thereof for controlling division of the overall resources 120 corresponding to an instance of a processing segment 312 for processing the processing request 112.

The credit checker block 404 can use the dynamic budgeting mechanism 314 to calculate the instance budget 410, the further budget 412, or a combination thereof for each instance of the processing segment 312. The credit checker block 404 can calculate the instance budget 410, the further budget 412, or a combination thereof for controlling, limiting, or designating an amount of resource used within corresponding instances of the processing segment 312 for processing the processing request 112.

The command processing block 406 can process the processing request 112 according to the corresponding budget. Details regarding the processing are discussed below.

The credit checker block 404 can further calculate the instance budget 410, the further budget 412, or a combination thereof based on predictions or estimations of upcoming demand. The credit checker block 404 can include a prediction block 416.

The prediction block 416 is configured to predict or estimate a demand or a requirement for resources from one or more instances of the requesting host 316. The prediction block 416 can predict or estimate for a current instance or an upcoming instance of the processing segment 312.

The prediction block 416 can predict or estimate based on calculating a consumption prediction 418. The consumption prediction 418 is an estimate of a demand or a requirement for resources from one or more instances of the requesting host 316. The consumption prediction 418 can predict the demand or the requirement for current or upcoming instance of the processing segment 312.

The consumption prediction 418 can be based on an estimate of an upcoming or current instance of the processing request 112 from a corresponding instance of the requesting host 316 or other hosts. The consumption prediction 418 can further be based on remaining instructions or processing portions of the current instance of the processing request 112.

The prediction block 416 can calculate the consumption prediction 418 based on the host profile 318, the processing request 112, or a combination thereof. The prediction block 416 can calculate the consumption prediction 418 using the credit management mechanism 118, the dynamic budgeting mechanism 314, or a combination thereof.

For example, the prediction block 416 can calculate the consumption prediction 418 based on the connection identifier 320, the physical function identifier 322, the virtual function identifier 324, the current or previous instance of the processing request 112, or a combination thereof. The prediction block 416 can use the various possible parameters as inputs to the credit management mechanism 118, the dynamic budgeting mechanism 314, or a combination thereof.

As a more specific example, the prediction block 416 can estimate the next instance of the processing request 112 or estimate remaining steps or instructions based on preceding instance of the processing request 112. The prediction block 416 can calculate the consumption prediction 418 as the type or the amount of resource associated with or required for the next instance of the processing request 112 or estimate remaining steps or instructions based on previous instances of similar requests, steps, or instructions.

Also as a more specific example, the prediction block 416 can estimate the behavior or pattern specific to the connection identifier 320, the physical function identifier 322, the virtual function identifier 324, the current or previous instance of the processing request 112, or a combination thereof. The prediction block 416 can calculate the consumption prediction 418 as the type or the amount resources of associated with or required for the specific behavior or pattern.

The credit checker block 404 can calculate the instance budget 410, the further budget 412, or a combination thereof based on the consumption prediction 418. The credit checker block 404 can calculate the instance budget 410, the further budget 412, or a combination thereof meeting all or a portion of the consumption prediction 418 of the corresponding instance of the requesting host 316.

The credit checker block 404 can further calculate the instance budget 410, the further budget 412, or a combination thereof based on the consumption prediction 418 of one or more hosts other than the requesting host 316. For example, the credit checker block 404 can calculate the instance budget 410, the further budget 412, or a combination thereof according to a priority associated with the hosts. Also for example, the credit checker block 404 can calculate the instance budget 410, the further budget 412, or a combination thereof balanced across the hosts according to the consumption prediction 418 of the hosts.

The credit checker block 404 can calculate the instance budget 410, the further budget 412, or a combination thereof based on the consumption prediction 418 for the current or upcoming instance of the processing segment 312. The credit checker block 404 can calculate the instance budget 410, the further budget 412, or a combination thereof based on the consumption prediction 418 corresponding to current or upcoming instance of the processing request 112.

It has been discovered that the budget, such as the instance budget 410 or the further budget 412, calculated at the data provider 116 provides improved response time. The budget can manage the conflicting demands across multiple hosts by metering and controlling the resource consumption with the budget. The reduction in conflicts and reduction in monopolization of the resource by one host over others can provide the improved response time.

It has further been discovered that the budgets calculated based on the host profile 318 for controlling the processing request 112 at the data provider 116 provides performance predictability. The budget calculated by the data provider 116 and implemented at the data provider 116 to control the usage of the overall resources 120 at the data provider 116 enables direct control based on real-time statuses. The control based on real-time direct status at the data provider 116 enables insight into usage and overall management unavailable at the requesting host 316 or the intermediate network component 108 of FIG. 1. The increased direct insight allows for predictable assessment and control over the resources, thereby providing predictability to the overall performance of the computing system 100.

It has further been discovered that the budget based on the consumption prediction 418 provides increased efficiency for the computing system 100. The consumption prediction 418, leveraging the character or usual behavior of the requesting host 316 can further be utilize the plan usage of the overall resources 120. Predicting the upcoming demand across hosts can enable efficient allocation of resources over time.

It has further been discovered that the budget calculated based on the host profile 318 including the connection identifier 320, the physical function identifier 322, the virtual function identifier 324, or a combination thereof provides efficiency over increased numbers of mechanisms supported and balanced by the data provider 116. The host profile 318 can accurately describe the processing request 112. The accurate description can further lead to accurate calculation of the budget and demand at a detailed granularity level. The detailed insight and parameter can provide necessary efficiency specific to each possible functions or features.

The credit checker block 404 can use the first storage unit 214, the second storage unit 246, a dedicated circuit or a component therein, or a combination thereof to calculate the instance budget 410, the further budget 412, or a combination thereof. The credit checker block 404 can further use the first control unit 212, the second control unit 234, or a combination thereof to calculate the instance budget 410, the further budget 412, or a combination thereof. The credit checker block 404 can store the instance budget 410, the further budget 412, or a combination thereof in the first storage unit 214, the second storage unit 246, or a combination thereof.

The control flow can pass to the command fetch block 402. The command fetch block 402 can fetch the processing command based on the budget corresponding to the requesting host 316. The command fetch block 402 can further communicate the corresponding budget to the requesting host 316 for adjusting the processing request 112. The control flow can further pass to the command processing block 406. The control flow can pass similarly as described above between the command fetch block 402 and the credit checker block 404, but using the processing result of the credit checker block 404, such as the instance budget 410, the further budget 412, or a combination thereof.

The command processing block 406 is configured to process the processing request 112. The command processing block 406 can process the processing request 112 based on generating the processing result 114 of FIG. 1. The command processing block 406 can generate the processing result 114 corresponding to and in response to the processing request 112.

For example, the command processing block 406 can access the NAND subsystem of a storage device or the data provider 116. Also for example, the command processing block 406 can read from or write to a specific location within the data provider 116. Also for example, the command processing block 406 can detect data, process intermediate data, report data, or a combination thereof according to the processing request 112 and the capabilities of a given data provider 116.

The command processing block 406 can generate the processing result 114 according to the budget or credit associated with the corresponding instance of the requesting host 316. The command processing block 406 can further process the processing request 112 using one or more instances of the processing segment 312. The command processing block 406 can utilize up to or not exceeding an amount of resource designated according to the instance budget 410, the further budget 412, or a combination thereof.

The command processing block 406 can calculate a device access-credit 420, a further access-credit 422, or a combination thereof during the processing for generating the processing result 114. The device access-credit 420 and the further access-credit 422 can each represent resources or portions of the overall resources 120 spent or utilized for servicing the corresponding instance of the requesting host 316.

The device access-credit 420 can correspond to the utilization of processing segment 312. The command processing block 406 can reset the device access-credit 420 for each instance of the processing segment 312, such as at the beginning or end.

For example, the command processing block 406 can count the number of commands or instructions executed in tracking the processing resource 124 for processing the processing request 112 from a corresponding instance of the requesting host 316. Also for example, the command processing block 406 can measure the bandwidth or a transfer rate of data in tracking the data resource 122 for processing the processing request 112 from a corresponding instance of the requesting host 316.

The command processing block 406 can generate the processing result 114 based on the remaining or utilized credits not exceeding the budget corresponding to the requesting host 316. The command processing block 406 can stop the processing when the device access-credit 420, the further access-credit 422, or a combination thereof meets the instance budget 410, the further budget 412, or a combination thereof.

The command processing block 406 can generate the processing result 114 as the output of the process up to the stoppage point. The command processing block 406 can further set a credit exhaustion status 424 representing whether the balance has reached the end of the budget.

The command processing block 406 can communicate or pass the credit exhaustion status 424, the remaining number of amount of credits, or a combination thereof to the credit checker block 404, the command completion block 408, or a combination thereof. The credit checker block 404 can use the credit exhaustion status 424, the balance, or a combination thereof to calculate the consumption prediction 418 and adjust the instance budget 410, the further budget 412, or a combination thereof.

It has been discovered that the budget implemented with balance at the data provider 116 provides increased reliability and predictability. The data provider 116 can control the overall resources 120 in real-time with actual usage data reflected in the balance. The actual usage data at the data provider 116 can provide insight otherwise missing at the intermediate network component 108 or the requesting host 316 including the first device 102. The control based on the balance and the budget can reduce conflicts across multiple hosts, thereby increasing reliability and predictability for the computing system 100.

The control flow can pass from the command processing block 406 to the command completion block 408. The control flow can pass similarly as described above between the command fetch block 402 and the credit checker block 404, but using the processing result of the command processing block 406, such as the device access-credit 420, the further access-credit 422, the credit exhaustion status 424, or a combination thereof.

The command completion block 408 is configured to finish the processing of the processing request 112. The command completion block 408 can finish by communicating the processing result 114 to the requesting host 316 that generated the processing request 112. The command completion block 408 can finish through completion posting.

The command completion block 408 can further return one or more credits. The command completion block 408 can return the one or more credits by returning the instance budget 410, the further budget 412, or a combination thereof to the credit checker block 404. The command completion block 408 can further return the credit by resetting the instance budget 410, the further budget 412, or a combination thereof.

The command completion block 408 can further pass or communicate the credit exhaustion status 424, the balance, or a combination thereof to the corresponding instance of the requesting host 316. The requesting host 316 can adjust a subsequent instance of the processing request 112 or any other processes therein based on the credit exhaustion status 424, the balance, or a combination thereof from the data provider 116.

It has been discovered that the processing request 112 based on communication direct from the data provider 116, such as the budget, the balance, the credit exhaustion status 424, or a combination thereof, provides increased overall efficiency. The direct feedback from the data provider 116 can be used to adjust the processes at each host via feedback, adjusting the processes from the host via budgeting. The direct feedback regarding the capacity of the data provider 116 along with other hosts can provide insight unavailable from blind systems or where the feedback is generated by the intermediate network component 108. The insight can be used to adjust for overall efficiency, which can further translate to increased efficiency for each device over time.

The credit checker block 404 can calculate the budget for the processing resource 124 and implement command count credit. The data provider 116 can use the command count credit to limit or control the number of individual commands serviced or carried out by the data provider 116 at any given point in time. Once this limit is reached or the credit is exhausted, the data provider 116 can stop further command fetching and processing.

The data provider 116 can begin at the beginning of the entity list and processes as many PCIe commands for that entity as its command count credit allows or host submits prior to the device fetch cycling. The data provider 116 can then move to the next entity on the next list entry to process as many PCIe commands for that entity as its command count credit allows. The data provider 116 can continue the above process until the data provider 116 reaches the end of the list. The data provider 116 can then repeat.

The credit checker block 404 can calculate the budget for the data resource 122 and implement data-transfer bandwidth credits for providing a way for the data provider 116 to limit the number of bytes transferred for a function or group functions, or to entire hosts, applications, or devices, according to corresponding groupings thereof. The limit can be imposed before beginning to process command transfers for other functions or groups of functions competing for transfer bandwidth transfer capacity.

The data provider 116 can begin at the beginning of the entity list and transfers as much data for that entity as its transfer bandwidth credit allows or host submits, prior to the device fetch cycle, before suspending transfer operations for that transfer command. The data provider 116 can then move to the next entity on the entity list to transfer as many bytes for that entity as its transfer bandwidth credit allows. The data provider 116 can repeat this process until the device reaches the end of the list. The data provider 116 can then repeat.

The instance budget 410, the further budget 412, or a combination thereof results in a physical transformation in the physical world, such as a physical change in the information communicated between devices, and utilized at and communicated through the requesting host 316. Movement in the physical world results in updates to the consumption prediction 418 or future demands, which can be fed back into the computing system 100 and generate subsequent instances of the instance budget 410, the further budget 412, or a combination thereof.

The computing system 100 has been described with module functions or orders as an example. The computing system 100 can partition the modules differently or order the modules differently. For example, the command processing block 406 and the command completion block 408 can be merged. Also for example, the credit checker block 404 can initiate by calculating the budget, the command fetch block 402 can then fetch the processing request 112 based on the budget.

Also for example, the command completion block 408 can return the credit or the budget back to the credit checker block 404. Also for example, the command fetch block 402 can track the usage or the balance.

As an illustrative example, the computing system 100 can implement an iterative scheme for the control flow. The control flow can be exchanged between the command fetch block 402 and the credit checker block 404 for the iterative scheme. The control flow can iteratively exchange between the command fetch block 402 and the credit checker block 404 to identify and interface with hosts and the manage the overall resources 120 according to the hosts.

Continuing with the illustrative example, the control flow can pass from the credit checker block 404 to the command processing block 406 as discussed above. The control flow can pass to the command processing block based on meeting a threshold condition, such as processing for or accounting for the all known or identified instances of the hosts. The control flow can be exchanged between the credit checker block 404 and the command processing block 406 for the iterative scheme.

Continuing with the illustrative example, the control flow can iteratively exchange between the credit checker block 404 and the command processing block 406 to process one or more requests or a portion therein corresponding to one or more hosts. The control flow can pass from the command processing block 406 to the command completion block 408 as discussed above. The control flow can pass based on meeting a threshold condition, such as generating a result or completing an internal process corresponding to the request.

Continuing with the illustrative example, the control flow can pass from the command completion block 408 to the credit checker block 404 as described above. The command completion block 408 can communicate with the hosts for providing results or notification purposes. The credit checker block 404 can process or update the credits as described above and reinitiate with the iterative mechanism.

Figure 5:
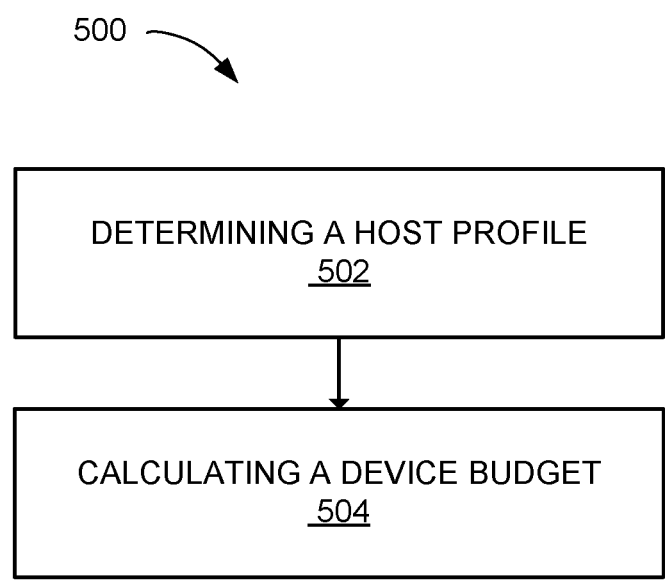
FIG. 5 is a flow chart of a method of operation of a computing system in an embodiment of the present invention.

Referring now to FIG. 5, therein is shown a flow chart of a method 500 of operation of a computing system 100 of FIG. 1 in an embodiment of the present invention. The method 500 includes: determining a host profile for representing a requesting host corresponding to a processing request in a block 502; and calculating an instance budget at a communication endpoint from an overall resource of the communication endpoint for controlling the processing request at the communication endpoint in a block 504.

The block 502 can further include determining the host profile based on a connection identifier, a physical function identifier, a virtual function identifier, or a combination thereof for representing the requesting host.

The block 504 can further include: calculating a consumption prediction for predicting a device access-credit for an upcoming instance of a processing segment; calculating the instance budget based on the consumption prediction; calculating the instance budget at the communication endpoint including a data provider for consuming the processing request; calculating the instance budget based on the connection identifier, the physical function identifier, the virtual function identifier, or a combination thereof; calculating the device budget corresponding to an instance of a processing segment for processing the processing request at the communication endpoint; or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
 a smart-storage device comprising:
 a control unit, including a processor, configured to:
 determine multiple instances of a host profile for representing a plurality of requesting hosts corresponding to a processing request for accessing the smart-storage device, the multiple instances of the host profile including a connection identifier describing a connection detail for each of the multiple instances of the host profile;
 calculate an instance budget for each of the requesting hosts as a portion of an overall resource of the storage device for servicing the processing request corresponding to an instance of the requesting hosts at a communication endpoint;
 process the processing request for each of the requesting hosts according to the corresponding instance of the instance budget, wherein priority for processing the processing request is based on a relative statuses of a device access-credit and the instance budget of the requesting hosts; and
 a communication mechanism, coupled to the control unit, configured to respond to the processing request from each of the requesting hosts based on the host profile, including the connection identifier describing a connection detail, and the priority of the requesting hosts.

2. The system as claimed in claim 1 wherein the control unit is configured to:
 calculate a consumption prediction for predicting the device access-credit for an upcoming instance of a processing segment; and
 calculate the instance budget based on the consumption prediction.

3. The system as claimed in claim 1 wherein the control unit is configured to receive information from the requesting hosts to calculate the instance budget, determine a priority, or a combination thereof based on a quality of service of the requesting hosts.

4. The system as claimed in claim 1 wherein the control unit is configured to:
 determine the host profile including a physical function identifier, a virtual function identifier, or a combination thereof for representing the requesting host; and
 calculate the instance budget based on the connection identifier, the physical function identifier, the virtual function identifier, or a combination thereof.

5. The system as claimed in claim 1 wherein the control unit is configured to calculate the instance budget corresponding to an instance of a processing segment for processing the processing request at the communication endpoint.

6. The system as claimed in claim 1 wherein the control unit is configured to:
 receive the processing request at the communication endpoint for processing the processing request from the requesting host;
 calculate the instance budget for a processing segment based on the processing request; and
 generate a processing result at the communication endpoint according to the instance budget in response to the processing request, the processing result corresponding to the processing segment.

7. The system as claimed in claim 1 wherein the control unit is configured to:
 calculate a consumption prediction based on the host profile, the processing request, or a combination thereof for predicting a device access-credit for the processing segment; and
 calculate the instance budget based on the consumption prediction.

8. The system as claimed in claim 6 wherein the control unit is configured to calculate the instance budget at the communication endpoint including a smart-storage device for consuming the processing request for the processing result.

9. The system as claimed in claim 6 wherein the control unit is configured to:
 calculate a device access-credit for representing the overall resource utilized for the requesting host; and
 generate the processing result with the device access-credit not exceeding the instance budget.

10. The system as claimed in claim 6 wherein the control unit is configured to:
 calculate a device access-credit corresponding to the processing segment for representing the overall resource utilized for the requesting host during the processing segment; and
 reset the device access-credit for each instance of the processing segment.

11. A method of operation of a computing system comprising:
 determining multiple instances of a host profile for representing a plurality of requesting hosts corresponding to a processing request for accessing a smart-storage device, the multiple instances of the host profile including a connection identifier describing a connection detail for each of the multiple instances of the host profile;
 calculating an instance budget for each of the requesting hosts as a portion of an overall resource of the storage device for servicing the processing request corresponding to an instance of the requesting hosts at a communication endpoint;
 processing the processing request for each of the requesting hosts according to the corresponding instance of the instance budget, wherein priority for processing the processing request is based on a relative statuses of a device access-credit and the instance budget of the requesting hosts; and
 responding to the processing request from each of the requesting hosts based on the host profile, including the connection identifier describing a connection detail, and the priority of the requesting hosts.

12. The method as claimed in claim 11 wherein calculating the instance budget includes:
 calculating a consumption prediction for predicting the device access-credit for an upcoming instance of a processing segment; and
 calculating the instance budget based on the consumption prediction.

13. The method as claimed in claim 11 further comprising receiving information from the requesting hosts for calculating the instance budget, determine a priority, or a combination thereof based on a quality of service of the requesting hosts.

14. The method as claimed in claim 11 wherein:
 determining the host profile includes determining the host profile including a physical function identifier, a virtual function identifier, or a combination thereof for representing the requesting host; and calculating the instance budget includes calculating the instance budget based on the connection identifier, the physical function identifier, the virtual function identifier, or a combination thereof.

15. The method as claimed in claim 11 wherein calculating the instance budget includes calculating the instance budget corresponding to an instance of a processing segment for processing the processing request at the communication endpoint.

16. A non-transitory computer readable medium including instructions for a computing system comprising:

determining multiple instances of a host profile for representing a plurality of requesting hosts corresponding to a processing request for accessing a smart-storage device, the multiple instances of the host profile including a connection identifier describing a connection detail for each of the multiple instances of the host profile;

calculating an instance budget for each of the requesting hosts as a portion of an overall resource of the storage device for servicing the processing request corresponding to an instance of the requesting hosts at a communication endpoint;

processing the processing request for each of the requesting hosts according to the corresponding instance of the instance budget, wherein priority for processing the processing request is based on a relative statuses of a device access-credit and the instance budget of the requesting hosts; and responding to the processing request from each of the requesting hosts based on the host profile, including the connection identifier describing a connection detail, and the priority of the requesting hosts.

17. The non-transitory computer readable medium as claimed in claim 16 wherein calculating the instance budget includes:

calculating a consumption prediction for predicting a device access-credit for an upcoming instance of a processing segment; and calculating the instance budget based on the consumption prediction.

18. The non-transitory computer readable medium as claimed in claim 16 further comprising receiving information from the requesting hosts for calculating the instance budget, determine a priority, or a combination thereof based on a quality of service of the requesting hosts.

19. The non-transitory computer readable medium as claimed in claim 16 wherein:

determining the host profile includes determining the host profile including a physical function identifier, a virtual function identifier, or a combination thereof for representing the requesting host; and calculating the instance budget includes calculating the instance budget based on the connection identifier, the physical function identifier, the virtual function identifier, or a combination thereof.

20. The non-transitory computer readable medium as claimed in claim 16 wherein calculating the instance budget includes calculating the instance budget corresponding to an instance of a processing segment for processing the processing request at the communication endpoint.

* * * * *